J. K. DE JONG.
ATTACHMENT FOR PLANTERS.
APPLICATION FILED JULY 1, 1908.

910,793.

Patented Jan. 26, 1909.

2 SHEETS—SHEET 1.

Inventor
J. K. DeJong,

J. K. DE JONG.
ATTACHMENT FOR PLANTERS.
APPLICATION FILED JULY 1, 1908.
910,793.
Patented Jan. 26, 1909.
2 SHEETS—SHEET 2.
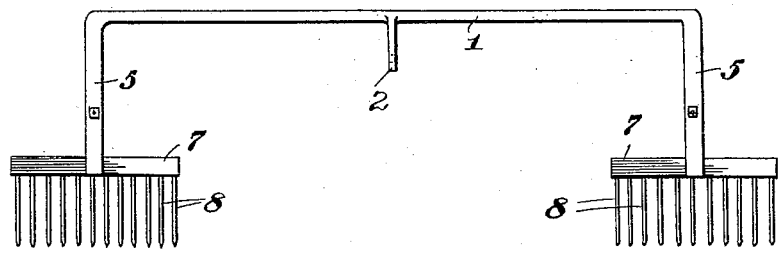
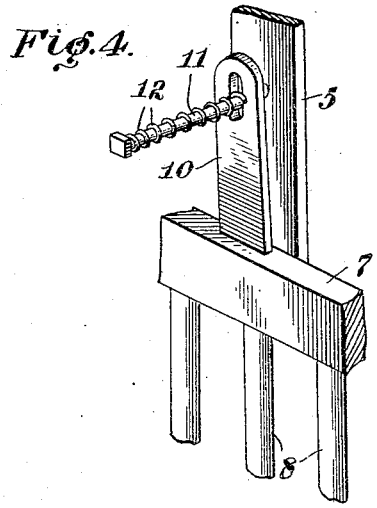
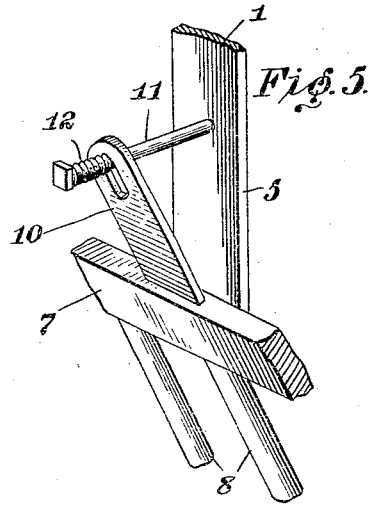

UNITED STATES PATENT OFFICE.

JOE K. DE JONG, OF ORANGE CITY, IOWA.

ATTACHMENT FOR PLANTERS.

No. 910,793.    Specification of Letters Patent.    Patented Jan. 26, 1909.

Application filed July 1, 1908. Serial No. 441,363.

*To all whom it may concern:*

Be it known that I, JOE K. DE JONG, citizen of the United States, residing at Orange City, in the county of Sioux and State of Iowa, have invented certain new and useful Improvements in Attachments for Planters, of which the following is a specification.

The present invention has for its object to prevent the washing out of grain after the same has been planted. It has been observed that during a heavy rain the water follows the tracks made by the covering wheels of the planter and washes out the corn or grain.

The present invention provides an attachment to operate on the ground immediately in the rear of the covering wheels so as to obliterate the usual tracks and loosen the soil with the result that the rain penetrates the ground instead of flowing over the same in streams and washing out the grain.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:—

Figure 1:
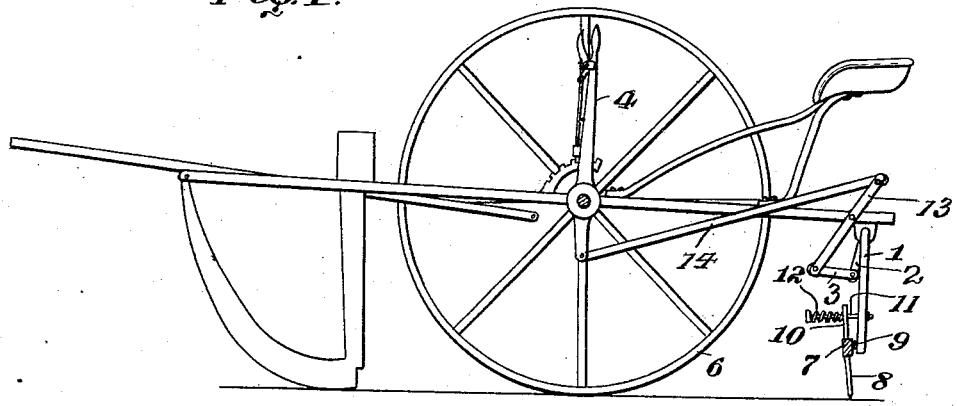
Figure 2:
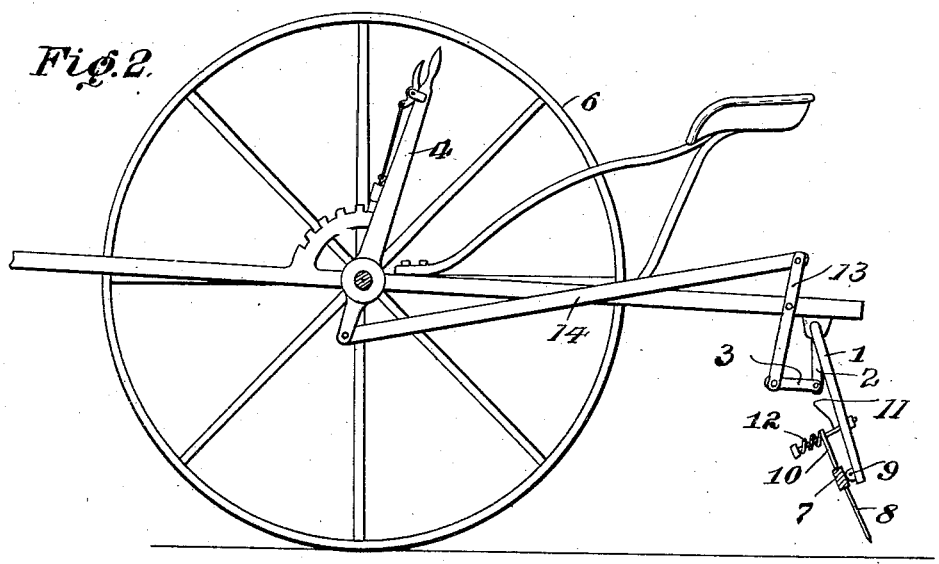

Figure 1 is a side view of a planter equipped with the invention, showing the attachment in operative position. Fig. 2 is a view similar to Fig. 1, showing the attachment elevated so as to clear the ground when turning the machine preliminary to recrossing the field. Fig. 3 is a rear view. Fig. 4 is an end view of the attachment on a larger scale. Fig. 5 is a view similar to Fig. 4, showing the position of the rake when yielding to clear an obstruction. Fig. 6 is a detail view showing a modified form of hinge connection between a rake and its support.

Corresponding and like parts are referred to in the following description and indicated in all the views of the drawings by the same reference characters.

The planter illustrated is of ordinary construction and is shown simply to demonstrate the application of the invention.

The attachment consists of an arch 1 mounted upon the rear portion of the planter frame so as to turn, said arch having an arm 2 which is connected to the lever 4, by means of which the runners are lifted when turning the machine. The vertical members 5 of the arch are provided with rakes which are arranged to operate in the rear of the covering wheels 6 of the planter. The rakes may be of any construction and size to cover any required track or extent of surface of the ground so as to level and loosen the same in the rear of the covering wheels and prevent the formation of tracks or channels which would tend to collect water and cause the same to flow in streams and wash out the grain. Each rake consists of a head 7 and teeth 8, the head 7 being hinged or pivoted at 9 to the upright member 5 of the arch. An arm 10 projects upward from the rake head and is apertured to receive a pole or rod 11 projected forward from the supporting member 5. A spring 12 is mounted upon the outer portion of the pole or rod 11 and is confined between a stop thereof at the upper end of the arm 10 and normally exerts a pressure upon said arm to hold the rake in vertical or normal position.

Should the rake meet with an obstruction, such as a root, stone or the like, it will yield and pass over the same, as indicated in Fig. 5, thereby preventing injury to the parts. When the planter is in operation, the attachment is thrown into working position by means of the lever 4, the rakes operating in the rear of the covering wheels 6 to effect the results hereinbefore stated. When it is required to turn the machine, the lever 4 is operated to lift the attachment, as indicated in Fig. 2, thereby preventing injury thereto in the turning of the machine.

It is to be understood that the attachment may be readily adapted to any make or style of planter, the purpose being to provide a rake to operate in the rear of the covering wheels for the purpose stated.

For convenience the arm 2 is pendent and is connected by link 3 to the lower end of lever 13, a link 14 connecting the upper end of the lever 13 to the lever 4.

Having thus described my invention, what is claimed as new is:

1. In combination with a planter comprising a pair of covering wheels, an arch having an approximate vertical arrangement and mounted by means of its horizontal member upon the frame of the planter, rakes yieldably connected with the vertical members of the arch and arranged to operate in the rear of the covering wheels, and means for turning said arch in its bearings to throw the brakes into or out of operative position.

2. In a planter, the combination of an upright arranged in the rear of a covering wheel, a rake pivoted to said upright, an arm extended upward from said rake, a rod projected from the upright and passed through an opening of said arm, and a spring mounted upon said rod and exerting a pressure upon the arm of the rake to normally hold the latter in working position.

In testimony whereof I affix my signature in presence of two witnesses.

JOE K. DE JONG. [L. S.]

Witnesses:
  GEO. H. VANDE STEEG,
  EDW. J. KRAAI.